United States Patent [19]
Palmer

[11] 3,715,760
[45] Feb. 6, 1973

[54] RIGID COLLAPSIBLE DISH STRUCTURE

[75] Inventor: William B. Palmer, Palos Verdes Estates, Calif.

[73] Assignee: TRW Inc., Redondo Beach, Calif.

[22] Filed: April 7, 1971

[21] Appl. No.: 132,065

[52] U.S. Cl. ............................................. 343/915
[51] Int. Cl. .......................................... H01q 15/20
[58] Field of Search ................... 343/840, 912, 915

[56] References Cited

UNITED STATES PATENTS 3,617,113  11/1971  Hoyer ................................. 343/915

Primary Examiner—Eli Lieberman
Attorney—Daniel T. Anderson et al.

[57] ABSTRACT

A collapsible dish structure composed of a number of radial petal assemblies spaced circumferentially about a central circular support and having rigid arcuate center petals hinged at their inner ends to the support by means of hinge shafts coupled to the petals and rigid arcuate side panels hinged along their longitudinal edges to one another and the center petals in a manner such that the petal assemblies are foldable inwardly to a compact collapsed configuration wherein the dish structure may be stowed with a space-craft or the like and outwardly to a deployed configuration wherein the petals are disposed edge to edge to form a rigid dish conforming to a surface of revolution generated about the dish axis, such as a parabolic surface.

10 Claims, 4 Drawing Figures

PATENTED FEB 6 1973

INVENTOR.
William B. Palmer
BY
Donald R. Nyhagen
ATTORNEY

PATENTED FEB 6 1973

INVENTOR.
William B. Palmer
BY
Donald R. Nyhagen
ATTORNEY

RIGID COLLAPSIBLE DISH STRUCTURE

BACKGROUND OF THE INVENTION

1. Field of the Invention

This invention relates generally to dish structures for use as antenna reflectors and the like. More particularly, the invention relates to a collapsible dish structure which is deployable to a rigid dish configuration.

2. Prior Art

Collapsible dish structures are well known in the art and widely used for space applications wherein the collapsible feature is important or essential to permit the dish structure to be stowed in a spacecraft during launch and deployed in space. A wide variety of collapsible dish structures have been devised. Examples of such dish structures are found in U.S. Pat. Nos. 3,064,534; 3,176,303; 3,286,270; 3,360,798; 3,377,594; 3,383,692; and 3,397,399.

The existing collapsible dish structures are of two general types, namely those with flexible dish forming elements which are designed to form a semi-rigid dish when employed and those with rigid dish forming elements which form a truly rigid dish when deployed. The existing dish structures with flexible dish forming elements are deficient in that the dish they form when deployed, while rigid to a degree, is not rigid to the degree required to form an accurate dish surface, such as a precise parabolic antenna reflection dish, at least one which maintains its precise curvature in the space environment. The existing truly rigid dish structures, on the other hand, are complex in construction, relatively massive, somewhat unreliable in deployment, and not totally suited to space applications.

SUMMARY OF THE INVENTION

The improved collapsible dish structure of the present invention has a central circular support surrounded circumferentially by a number of radial petal assemblies. Each petal assembly has a rigid arcuate center pedal and rigid arcuate side petals along either side of the center petal. The inner ends of the center petals are hinged to the center support on hinge axes tangent to a common circle centered on the central axis of the center support. The side petals of each petal assembly are hinged to their center petal on hinge axes along the longitudinal petal edges. The side petals of adjacent petal assemblies are hinged to one another on hinge axes along the longitudinal petal edges.

The petal assemblies are foldable inwardly to a collapsed configuration wherein the adjacent side petals of adjacent petal assemblies are disposed in face to face relation to one another and in inwardly folded transverse relation to their respective center petals. In this configuration, the dish structure is contained within a cylindrical envelope only slightly larger in diameter than the center support of the dish structure.

The petal assemblies are unfoldable outwardly to a deployed configuration in which the petals are disposed edge to edge and form a rigid dish conforming to a surface of revolution generated about the axis of the center support of the dish. In a dish structure intended for use as an antenna reflector, this surface of revolution is a parabolic surface and the petals are provided with inner electrically conductive surfaces.

Deployment means are provided for unfolding the petal assemblies to their deployed configuration. According to a feature of the invention, the petal deployment means comprise hinge shafts for the center petals which are connected to the inner ends of the latter petals and journalled about the edge of the dish support to turn on the hinge axes of the center petals. The hinge shafts of adjacent petal assemblies are coupled by universal joints or the like to effect deployment of the petals in unison.

DESCRIPTION OF THE PREFERRED EMBODIMENTS

Figure 2:
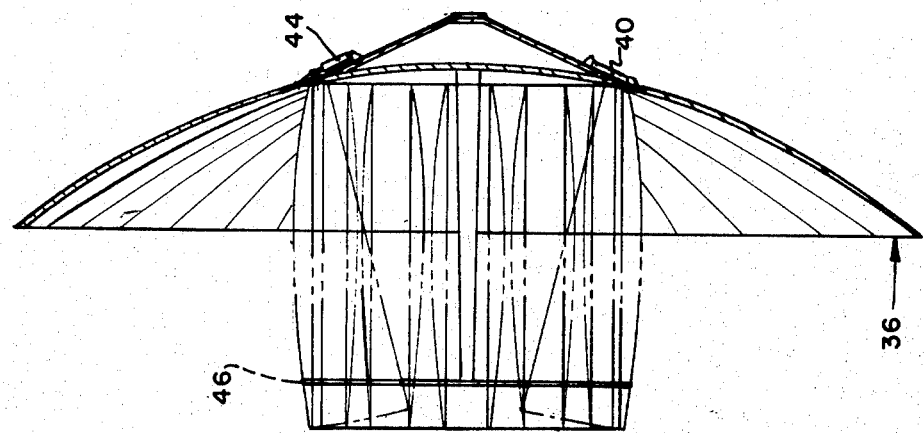
FIG. 2 is a section through the dish structure showing in broken lines the structure in its collapsed configuration.

The illustrated collapsible dish structure 10 of the invention has a central generally circular support 12, about the circumference of which are a number of radial petal assemblies 14. Each petal assembly has a rigid arcuate center petal 16 and two rigid arcuate side petals 18. In their preferred form, each petal is constructed from a relatively light-weight though rigid material, such as a honeycomb core material. As will be explained presently, the several petals each conform to a common concave-convex curvature.

At the inner end of each center petal 16 are hinge shafts 20 to which the petal is fixed by plates 22. Hinge shafts 20 are rotatably supported in arms 24 of bearing brackets 26 attached rigidly to and spaced circumferentially about the central support 12 of the dish structure. Hinge shafts 20 pivotally support the center petals 16 on the support 12 for folding and unfolding motion about hinge axes tangent to a common circle centered on the axis of the support, as will be explained in greater detail presently.

Each side petal 18 is joined along its inner longitudinal edge to its center petal 16 by hinges 28 adjacent the radially inner and outer ends of these edges. Hinges 28 are secured to the inner surfaces of the petals, and each pair of hinges have a common hinge axis extending along the edges of their respective petals in chordlike relation to the concave inner petal surfaces. Each pair of adjacent side petals 18 are joined along their adjacent outer edges by hinges 30 located adjacent the radially inner and outer ends of the edges. Each pair of hinges 30 have a common hinge axis extending along the adjacent panel edges.

Figure 1:
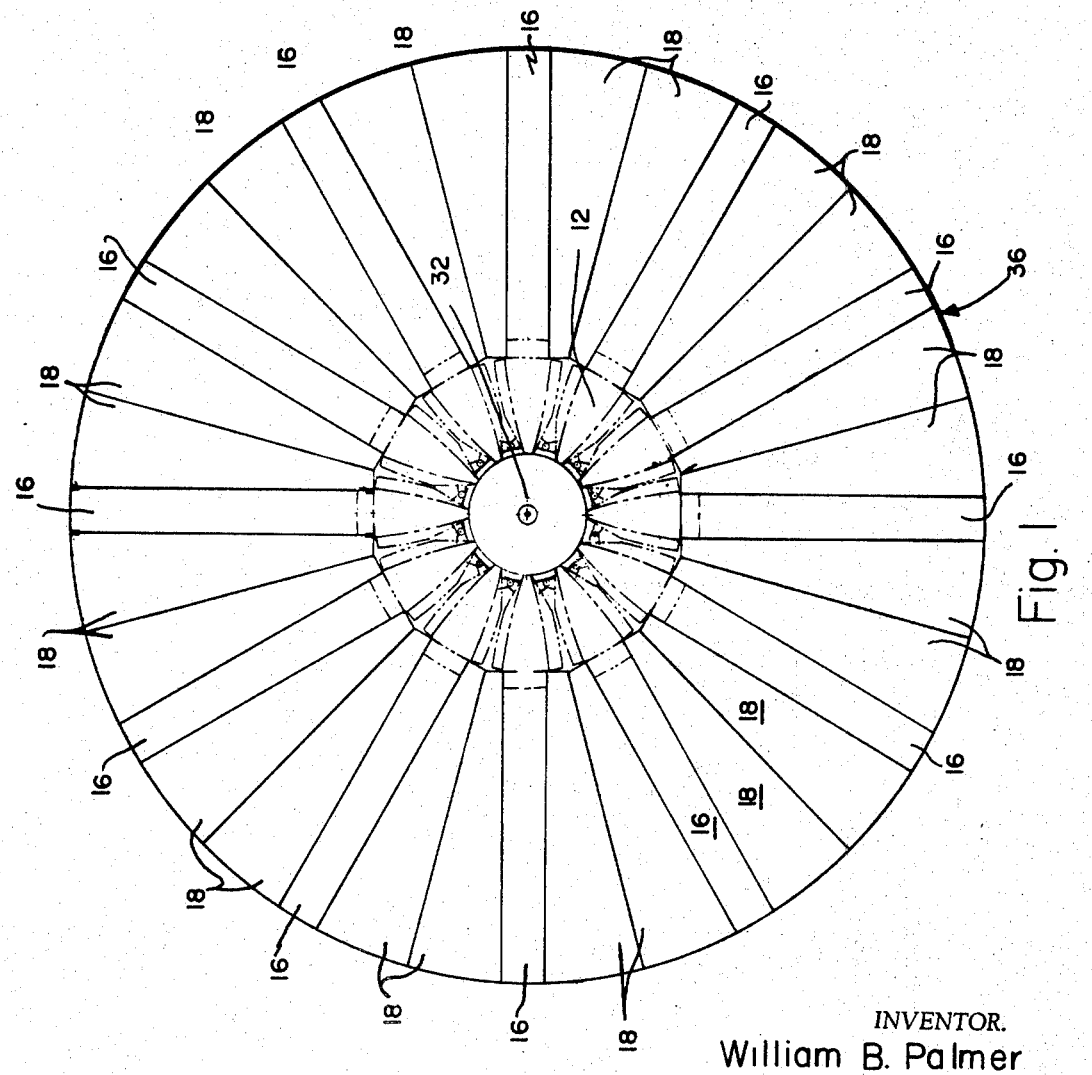
FIG. 1 is a front view of the present dish structure in deployed configuration.
Figure 3:
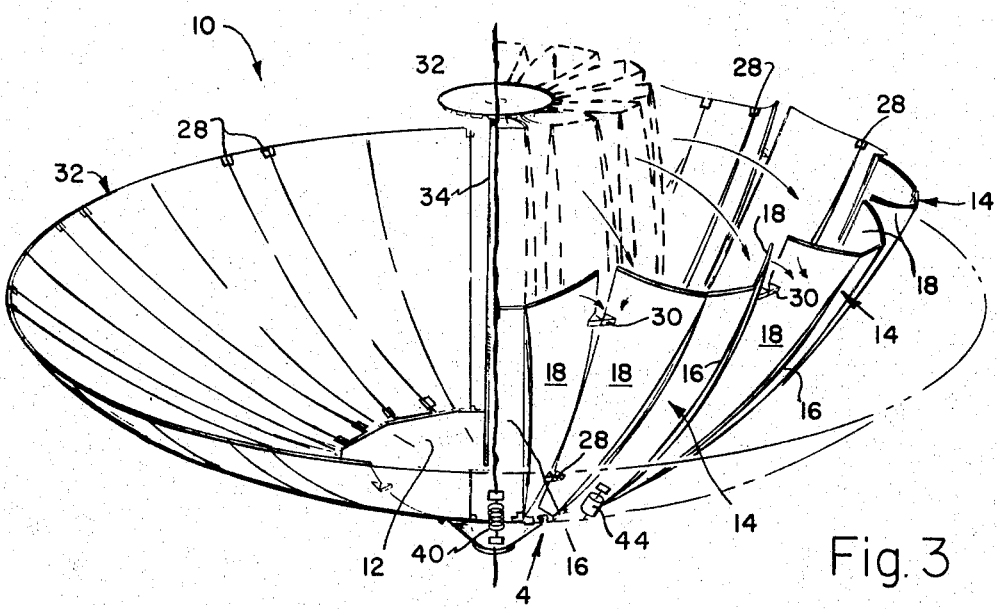
FIG. 3 is a semi-diagrammatic view showing the dish structure in its collapsed partially deployed, and fully deployed configurations.
Figure 4:
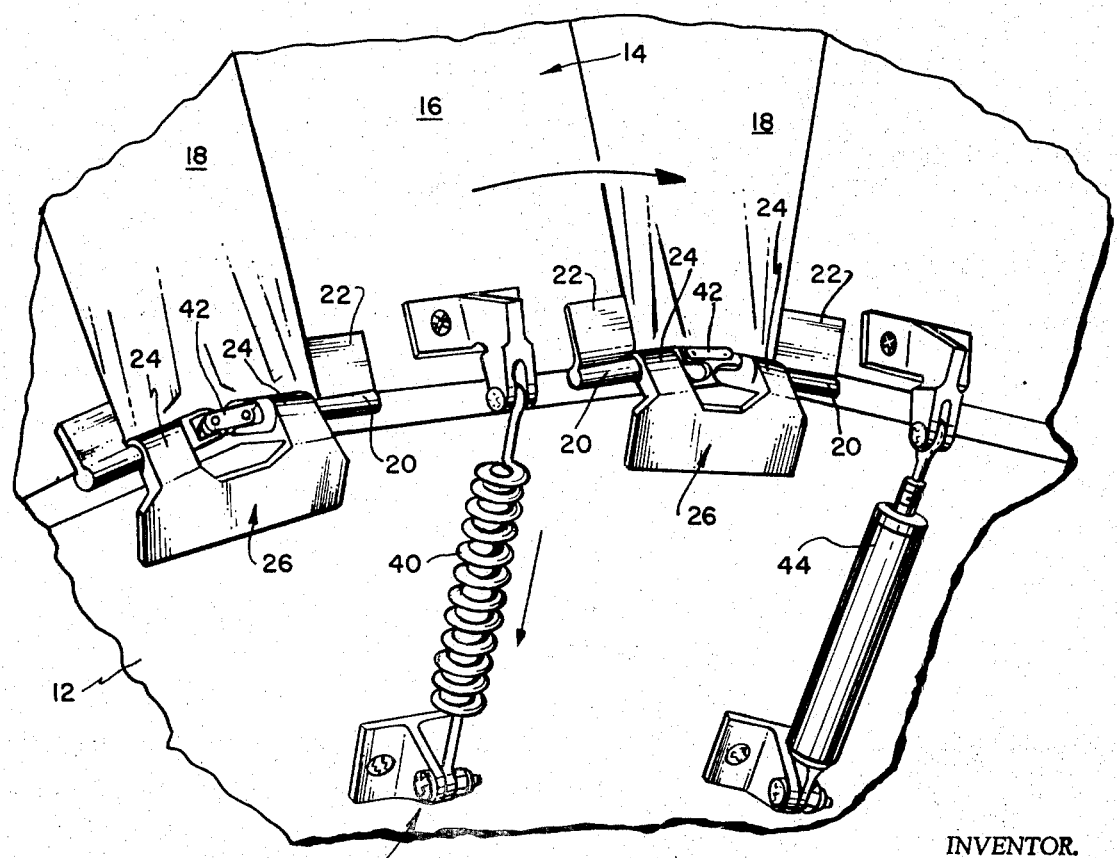
FIG. 4 is an enlarged fragmentary view looking in the direction of the arrow 4 in FIG. 3.

Petal assemblies 14 are rotatable or foldable inwardly about their hinge axes to their broken line folded or collapsed configuration of FIGS. 2 and 3. In this collapsed configuration, the center petals 16 generally parallel the central axes of the center support 12. The adjacent side petals 18 are folded inwardly relative to their center petals into face to face relation with one another and transverse relation to their center petals. The collapsed dish structure is contained within a cylindrical envelope which is only slightly larger in diameter than the support 12. The illustrated dish structure has a cradle 32 attached by a post 34 to the support 12 for supporting the folded petals. The petal assemblies are rotatable or unfoldable outwardly to their solid line deployed configuration of FIGS. 1 and 2. In this deployed configuration, the petals 16, 18 are disposed edge to edge and form a rigid dish 36.

As noted earlier, the petals 16, 18 conform to a common compound concave-convex curvature. That is to say, the inner concave surfaces of the petals have the same concave curvature and the outer convex surfaces have the same convex curvature. These petal curvatures are such that in their deployed configuration, the petals form a dish 36 conforming to a surface of revolution generated about the axes of the center support 12. In an antenna reflector dish structure, this surface of revolution is a parabolic surface.

Dish structure 10 is equipped with deployment means 38 for rotating or unfolding the petal assemblies 14 from their collapsed or folded configuration to their deployed configuration. The illustrated deployment means comprise tension springs 40 (only one shown) connected between the support 12 and certain of the center petals 16 for yieldably urging the center petals outwardly to deployed position. The hinge shafts 20 of the adjacent center petals are connected by universal couplings 42 so that all of the center petals deploy in unison.

This deployment of the center petals, in turn, deploys the intervening side petals 18. If necessary, the side petal hinges 30 may embody springs for urging the side petals to deployed position. Dampers 44 are provided to limit the deployment rate. In their deployed positions, the adjacent edges of the petals abut to positively locate the petals in deployed position. If desired, latch means may be provided for locking the petals in deployed position. In any event, the fully deployed petals form a rigid dish 37 which accurately maintains its shape, whereby the dish may be designed to conform to a precise surface of revolution.

The dish structure is retained in its collapsed or contracted configuration by a band 46 (FIG. 2). This band is severed or otherwise parted to permit deployment of the structure by the springs 40.

What is claimed as new in support of Letter Patent is:

1. A collapsible dish structure comprising:

a rigid generally circular center support;

a number of petal assemblies uniformly spaced about said support each including a rigid center petal with inner and outer ends, side petals along the longitudinal edges of the center petal, and hinge means pivotally joining the center and side petals on hinge axes along the adjacent longitudinal petal edges;

hinge means pivotally joining the inner ends of said center petals to said support on pivot axes tangent to a common circle generated about the axis of said support;

hinge means pivotally joining the adjacent side petals of adjacent petal assemblies on pivot axes along the adjacent longitudinal edges of the adjacent side petals;

said petals being unfoldable outwardly about their hinge axes to deployed positions and having a common compound curvature such that in said deployed positions the petals conform to a common surface of revolution generated about said support axis so as to form a concave-convex dish of given rim diameter; and said petals being foldable inwardly about their hinge axes from said deployed positions to folded positions wherein the adjacent outer petals extend inwardly from and in transverse relation to their respective center petals and in face to face relation with one another, and the petals are contained within a cylindrical envelope having a diameter substantially less than said dish rim diameter.

2. A collapsible dish structure according to claim 1, including:

deployment means for unfolding said petals from their folded positions to their deployed positions.

3. A collapsible dish structure according to claim 2, wherein: said deployment means comprise means connected to said center petals.

4. A collapsible dish structure according to claim 3, wherein:

said hinge means joining the center petals to said support comprise pivot shafts rotatably mounted on said support and fixed to said center panels, and coupling means joining the adjacent pivot shafts for deployment of said petals in unison.

5. A collapsible dish structure according to claim 4, wherein:

said deployment means comprise springs connected between said support and certain center petals.

6. A collapsible dish structure according to claim 1, wherein:

said hinge means joining the center petals to said support comprise pivot shafts rotatably mounted on said support and fixed to said center panels, and coupling means joining the adjacent pivot shafts for deployment of said petals in unison.

7. A collapsible dish structure according to claim 6, wherein:

said surface of revolution is a parabolic surface.

8. A collapsible dish structure according to claim 7, wherein:

said support comprises a post along said support axis against which said side petals seat in folded position.

9. A collapsible dish structure according to claim 1, wherein:

said surface of revolution is a parabolic surface.

10. A collapsible dish structure according to claim 1, wherein:

said support comprises a post along said support axis against which said side petals seat in folded positions.

* * * * *

UNITED STATES PATENT OFFICE
CERTIFICATE OF CORRECTION

PATENT NO. : 3,715,760
DATED : February 6, 1973
INVENTOR(S) : William B. Palmer

It is certified that error appears in the above-identified patent and that said Letters Patent are hereby corrected as shown below:

Column 1, line 21  Correct "employed" to read --deployed--

Signed and Sealed this fourteenth Day of October 1975

[SEAL]

Attest:

RUTH C. MASON
Attesting Officer

C. MARSHALL DANN
Commissioner of Patents and Trademarks